Figure 4:
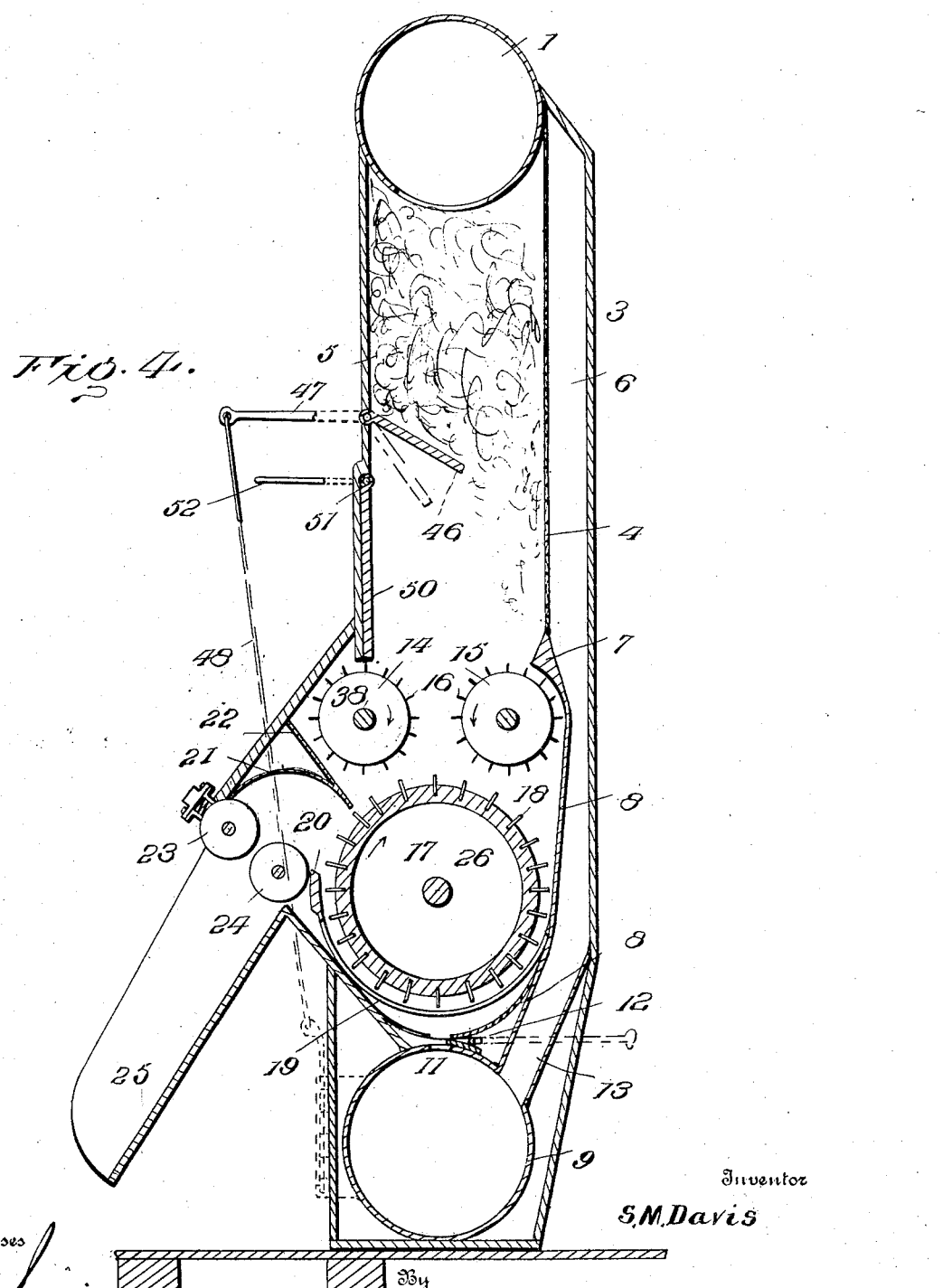

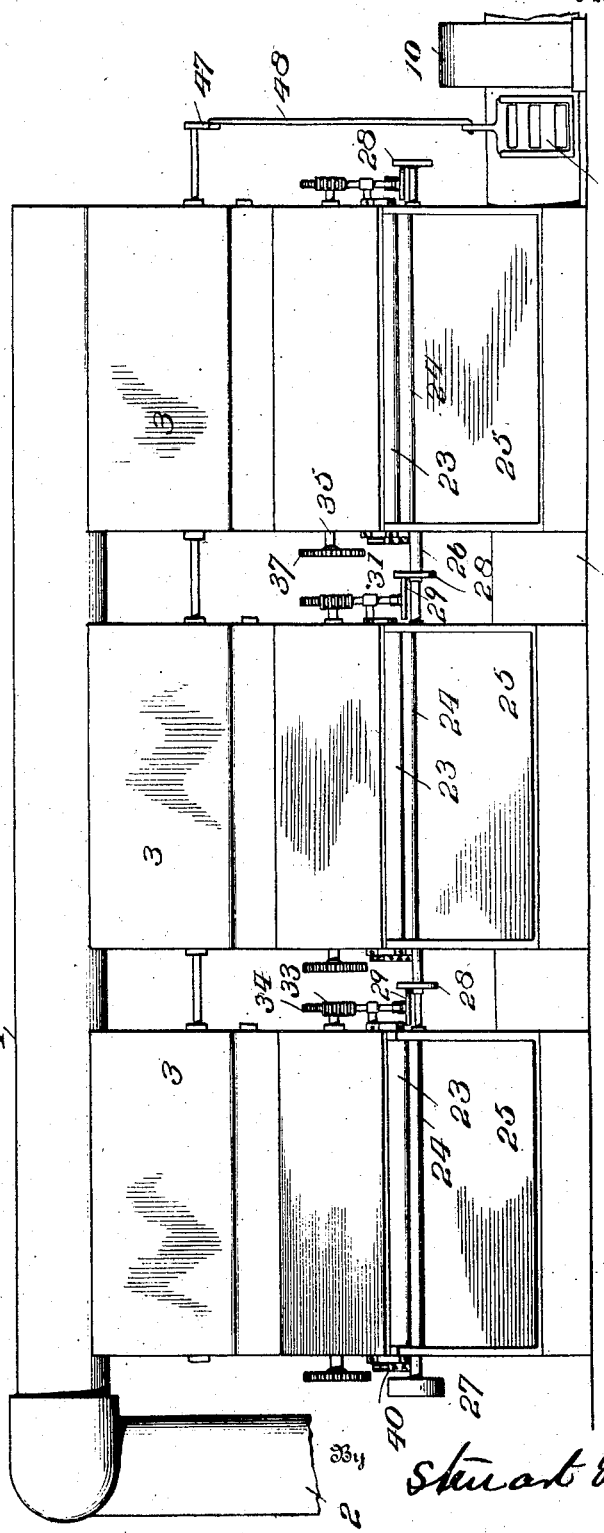

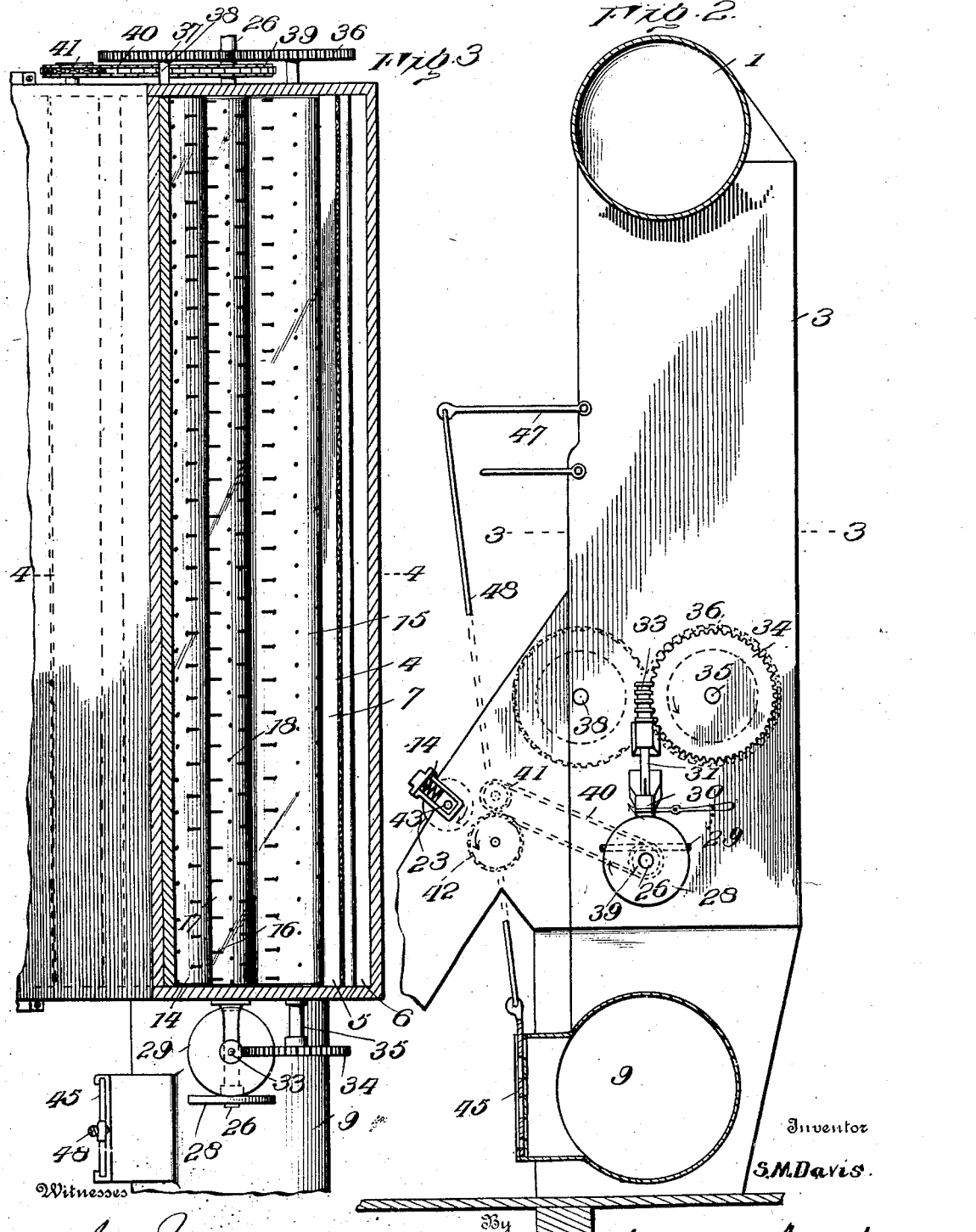

No. 830,646. PATENTED SEPT. 11, 1906.
S. M. DAVIS.
COTTON ELEVATOR, CLEANER, AND FEEDER.
APPLICATION FILED DEC. 15, 1905.

3 SHEETS—SHEET 3.

Witnesses

Inventor
S. M. Davis
By
Stewart & Stewart
Attorneys

UNITED STATES PATENT OFFICE.

SAMUEL M. DAVIS, OF BALTIMORE, MARYLAND.

COTTON ELEVATOR, CLEANER, AND FEEDER.

No. 830,646.

Specification of Letters Patent.

Patented Sept. 11, 1906.

Application filed December 15, 1905. Serial No. 291,950.

*To all whom it may concern:*

Be it known that I, SAMUEL M. DAVIS, a citizen of the United States of America, and a resident of Baltimore city, State of Maryland, have invented certain new and useful Improvements in Cotton Elevators, Cleaners, and Feeders, of which the following is a specification.

My invention relates to certain new and useful improvements in cotton elevators, cleaners, and feeders.

The object of my invention is to provide means for handling cotton which will be automatic in their action and which will more thoroughly clean the cotton than has heretofore been possible and which at the same time will remove and kill any boll-weevils or other insects which may be in the cotton.

My invention is particularly designed for the purpose of elevating, conveying, and cleaning the cotton and feeding it directly to the gins, whereby the cotton is improved in quality and the method of handling rendered more simple and economical than heretofore, the supply of cotton to the cleaners being automatically regulated by the cotton itself, the killing of the boll-weevils and other insects being incident to these operations.

One object of my invention is to combine with the elevating and conveying mechanism for the cotton positive means for separating and removing boll-weevils, dust, leaf trash, and other impurities before the cotton is passed to the gins, the boll-weevils after they are separated from the cotton being killed as they pass through the machine. By my construction all foreign matter is removed from the cotton before it passes to the gins. Consequently the saws are not liable to be clogged or broken or rapidly worn away, as will be the case when all foreign matter is not separated from the cotton before passing to the gins.

I further provide means by which the amount of cotton fed to the cleaners is automatically regulated by the supply of cotton to the cleaners. Consequently the cleaners will not become clogged up by an oversupply of cotton and the cotton will not be fed so fast through the cleaners as to prevent the thorough separation of all foreign matters from the cotton.

For the purpose of disclosing the preferred form of my invention, so as to enable those skilled in the art to make and use the same, reference is had to the accompanying drawings and specification, wherein the same parts are designated by the same reference-numeral wherever they occur.

Figure 1 is a front elevation of the preferred form of my invention, showing a battery of cleaners and the conveying mechanism. Fig. 2 is a side elevation of the cleaner on the right of Fig. 1, showing the means for automatically controlling the supply of cotton to the cleaners. Fig. 3 is a transverse section of the cleaner shown in Fig. 2, taken on line 3 3 of Fig. 2. Fig. 4 is a section of the cleaner, taken on line 4 4 of Fig. 3.

1 designates the pneumatic conveyer through which the cotton is carried by an air suction—that is to say, means are provided for producing a suction in the pipe which by withdrawing or exhausting the air from said conveyer and admitting air from the part of the conveyer where the cotton is introduced will cause the cotton to be carried along by the current of air so produced. The open end of the conveyer is provided with a drop-pipe 2 of any desired form, by which cotton may be picked up from a wagon or other container of the cotton in the well-known manner.

3 designates a series of cleaner-boxes, which are connected at their upper ends to the conveyer 1, as is shown in Fig. 4. Referring to Fig. 4, it will be seen that each cleaner is provided with a foraminous partition 4 of wire screen or the like which divides the cleaner into two chambers 5 and 6. The foraminous wall 4 is connected at its upper end to the top of the chamber 5 and at its lower end to a cross-piece 7. 8 is a shield of sheet metal or the like extending down from the cross-piece 7 and connected at its lower end to the top of a pipe 9, which extends below all the cleaners and to one end of which there is connected an exhaust-fan 10. 11 is an opening provided in the top of the pipe 9 adjacent to the end of each of the shields 8, these openings being each provided with a valve 12, by which the width of each opening may be varied. 13 is a pipe leading from the opening in the side of the pipe 9 behind each of the shields 8 and into the chambers 6. Located in the sides of the cleaner, preferably just below the strip 7, are the feed-rollers 14 15, these rollers being provided with spikes 16 and adapted to be driven in the directions of the arrows (shown in Fig. 4) by means to be hereinafter described. 17 is a cylinder or drum mounted in the lower portion of the cleaner below the rollers 14 and 15 and provided with projections 18. 19 is a foraminous screen which at one end is connected to the partition 8 and at the other end to a cross-strip 20, the screen being curved, as shown in Fig. 4, so that it forms a segment of a circle around the drum 17, past which the cotton is carried. 21 is a curved deflector-plate held in position by supports 22 and adapted to remove the cotton from the projections on the drum and deflect it between the pair of feed-rollers 23 and 24 and into the chute 25, by which the cotton passes into the gin. The drums 17 are mounted on a shaft 26, which extends through the battery of cleaners and is provided on one end with a driving-pulley 27, by which power is supplied. At one side of each of the cleaners just outside the casing I provide a disk gear 28, which is fast on the shaft 26, and 29 is a disk mounted in a plane at right angles to disk gear 28 and supported on sleeve 30, feathered on a shaft 31, mounted in a suitable bracket 32, so that an edge of the disk 29 will be in contact with the face of the disk 28. By mounting the disk 29 on a sleeve feathered to the shaft 31 the speed of rotation of the shaft may be varied by moving the disk 29 toward or away from the periphery of the disk 28. The shaft 31 is provided on its upper end with a worm 33, which is in mesh with a worm-gear 34, mounted on one end of the shaft 35 of the feed-roller 15 of each of the cleaners. At the end of the shaft opposite that carrying the worm-gear 34 the shaft 35 is provided with a gear 36, which meshes with a gear 37, mounted on the shaft 38 of the feed-roller 14, whereby the rollers will be driven at the same speed and in the direction of the arrows, (shown in Fig. 4,) the speed of these rollers being varied as desired by the adjustment of the sleeve 30 on the shaft 31. Mounted on the shaft 26 adjacent to each of the cleaners is a sprocket-wheel 39, over which runs a sprocket-chain 40, and 41 is an idle sprocket-wheel, over which the other end of the chain runs. 42 is a sprocket-wheel mounted on one end of the shaft of the feed-roller 24 and engaging the side of the sprocket-chain 40, by which it is driven. The shaft of the feed-roller 23 is preferably mounted in boxes 43, which are mounted in slots, and the boxes are held in the slots by the springs 44, whereby the feed-roller 23 is yieldingly pressed toward the feed-roller 24. As far as described the cleaners are all alike, and the description of one applies to all.

Preferably and as shown the fan 10 is placed at the end of the pipe 9 of the battery of cleaners opposite that at which the conveyer 1 takes in the cotton. Adjacent to the fan the pipe 9 is provided with a valve 45, which when open will admit air directly to the fan, and consequently check the suction on the system, but the free admission of air to the fan will permit it to be used for blowing although the cleaner may be out of action. When the cotton has been cleaned, it is passed to the gins and separated from the seed. The seed is then conveyed by a screw or other conveyer to the exhaust-pipe of the fan 10 and by that exhaust-blast driven to the cotton-seed house. In cleaners heretofore in use the exhaust-blast was stopped by the choking of the cleaner or shutting it down; but in my device I stop the operation of the cleaner by opening the valve 45, which cuts off the suction from the cleaner, but leaves the fan in full operation to remove the seed as fast as it comes from the gins. The flow of seed from the gins is constant so long as they are supplied with cotton, and if the fan is relied upon to carry away this seed it must be in constant operation or the machine will become clogged with the seed and cannot then be started without cleaning out and great delay. Hence it is of the highest importance that the fan should never be stopped or reduced materially in power while seed is coming from the gins.

46 is a plate pivotally mounted in the chamber 5 of the cleaner which is adjacent to the fan. This plate 46 is provided with an arm 47, which extends outside the cleaner and is connected by a link 48 to the valve 45. As shown, the valve 45 is formed by a series of slots in the pipe 9 and a series of slots in the plate which forms the other member of the valve. These slots are so located that when the plate 46 is in position as shown in dotted lines in Fig. 4 the slots will register and the valve will be open. When, however, the plate 46 is in the position shown in full lines in Fig. 4 the valve will be closed, as shown in Fig. 2. The valve-actuating mechanism is so balanced that when a sufficient supply of cotton is in the upper part of the chamber 10 to move the plate 46 from the full-line position (shown in Fig. 4) to the dotted-line position the valve 45 will be opened, and consequently the suction of the fan on the system will be stopped, thus stopping the feed of cotton. As soon as the amount of cotton in the chamber has been decreased by the feed-rollers 14 and 15 so that the plate 46 can swing to its full-line position due to the weight of the parts overcoming the pressure of the cotton the valve will be closed, thus throwing the suction onto the system, and consequently causing the cotton to again pass to the cleaners. I have located this valve-controlling mechanism on the cleaner farthest from the receiving end of the conveyer, whereby the supply of cotton will not be cut off until the entire battery of cleaners is supplied with cotton.

In the operation of my machine after it has been set in operation the pipe 2 is connected to a suitable source of supply of cotton, when the suction produced by the fan 10 will draw the cotton through the conveyer-pipe and into the chamber 5 of the cleaners. The cotton in the chamber 5 will pass down in front of the screen 4, and part of the dirt and trash in the cotton will pass through the screen, down the chamber 6, and through the pipe 13 into the pipe 9. The cotton at the lower end of the chamber 5 is passed between the feed-rolls 14 and 15 as they turn, but said feed-rolls turn slowly, and as the cotton is slowly passed down by the feed-rolls it is caught by the teeth of the roller 17, which is traveling at a much higher speed, in small portions and carried to the screen 19. The feed-rolls 14 and 15 turn at a speed of two to three revolutions per minute, while the roller 17 turns at a speed of one hundred and seventy revolutions per minute, with the result that the peripheral speed of roller 17 is about two hundred times as great as that of the feed-rolls. The cotton is thus carded out into a very thin film before it is passed over the screen 19, where the remaining trash and foreign matter, including the boll-weevils which may be in the cotton, are all separated and pass through the screen 19 into the pipe 9, the cotton being carried around by the drum 17 until it reaches the deflector 21, where it is picked up and passed into the feed-roller 23 to the chute 25 into the gin. The fan 10 is run at a very high rate of speed, and all matter dropping into the pipe 9 must pass through the fan 10. Consequently any boll-weevils which were in the cotton having been separated from the cotton by the cleaner and dropped into the pipe 9 will pass through the fan. They will be struck by the blades of the fan in passing through the fan and will be killed, thus preventing them from getting into the cotton-seed to do further damage.

By my automatic regulator for the supply of cotton to the cleaners, which I have described, the cleaners are kept at their maximum efficiency and clogging of the cleaners by feeding too much cotton into the cleaners is avoided.

In order to be able to separate different lots of cotton, I provide each of the cleaners with a valve 50, pivoted in the side of each of the cleaners. These valves are preferably mounted on a shaft 51, extending through the whole battery of cleaners, and provided at a suitable point with an operating-handle 52. By this construction after all the cotton in the cleaners has passed below the valves the valve may be shut and the pipe 2 fed with a fresh supply of cotton, which will be drawn into the cleaners above the valve. The valve can now be left closed until all the cotton below the valve has passed out and into the gins, when upon opening the valve the fresh cotton is allowed to pass through. In consequence of this construction it will be possible to keep separate different lots of cotton without stopping the operation of the gins.

While I have described what I believe to be the preferred form of my invention, I desire to have it understood that many changes can be made in the form, construction, and arrangement of parts and other mechanisms substituted for that shown and described for carrying out the operation described without departing from my invention.

What I desire to claim as new and secure by Letters Patent is—

1. The combination with a series of cleaners for cotton, each adapted to supply cotton to a gin, of means for supplying cotton to all the cleaners, and means controlled by the amount of cotton in one of the cleaners to control the supply of cotton to all the cleaners.

2. The combination with a conveyer-pipe, of a series of cleaners to which cotton is fed from the conveyer-pipe, an exhaust-pipe connected to the cleaners, means for producing an exhaust in the exhaust-pipe, and means controlled by the supply of cotton in one of the cleaners to control the exhaust.

3. The combination with a conveyer-pipe, of a cleaner to which cotton is fed from the conveyer-pipe, an exhaust-pipe connected to the cleaner, means for producing an exhaust in the exhaust-pipe, a valve in the exhaust-pipe opening to the atmosphere and means for controlling the opening and closing of the valve operated by the supply of cotton in the cleaner.

4. The combination with a conveyer-pipe, of a cleaner to which cotton is fed from the conveyer-pipe, an exhaust-pipe connected to the cleaner, means for producing an exhaust in the pipe, a valve in the exhaust-pipe opening to the atmosphere, a pivoted plate in the cleaner adapted to be operated by the cotton fed to the cleaner, and connections between the plate and the valve whereby the amount of cotton in the cleaner will control the operation of the valve.

5. The combination with a conveyer-pipe, of a cleaner to which cotton is fed from the conveyer-pipe, an exhaust-pipe connected to the cleaner, means for producing an exhaust in the exhaust-pipe and a valve in the exhaust-pipe located between the cleaner and the exhausting device, said valve opening to the atmosphere, and means for controlling the opening and closing of the valve operated by the supply of cotton in the cleaner.

6. The combination with a conveyer-pipe, of a cleaner to which cotton is fed from the conveyer-pipe, an exhaust-pipe connected to the cleaner, means for producing an exhaust in the pipe, a valve in the exhaust-pipe located between the cleaner and the exhausting device, said valve opening to the atmosphere, a pivoted plate in the cleaner adapted to be operated by the cotton fed to the cleaner, and connections between the plate and the valve, whereby the amount of cotton in the cleaner will control the operation of the valve.

7. A cleaner adapted to clean cotton composed of a chamber into which the cotton is fed, having a foraminous side wall, a pair of feed-rollers located in the lower part of the chamber, a drum located below the feed-rollers, a foraminous wall located below the drum past which the cotton is carried by the drum, an imperforated wall between the two foraminous walls, an exhaust-pipe below the lower foraminous wall and a connection between the exhaust-pipe and the space behind the upper foraminous wall.

Signed by me at Baltimore city, State of Maryland, this 30th day of December, 1904.

SAMUEL M. DAVIS.

Witnesses:
LESTER H. LATHAM,
T. A. LEE.